F. A. KEMP & E. C. REEDER.
MECHANICAL CLUTCH.
APPLICATION FILED FEB. 17, 1914.

1,125,555.

Patented Jan. 19, 1915.

2 SHEETS—SHEET 1.

Witnesses:

Inventors
Fred H. Kemp
Edwin C. Reeder by
Gifford & Bull
their Attorneys

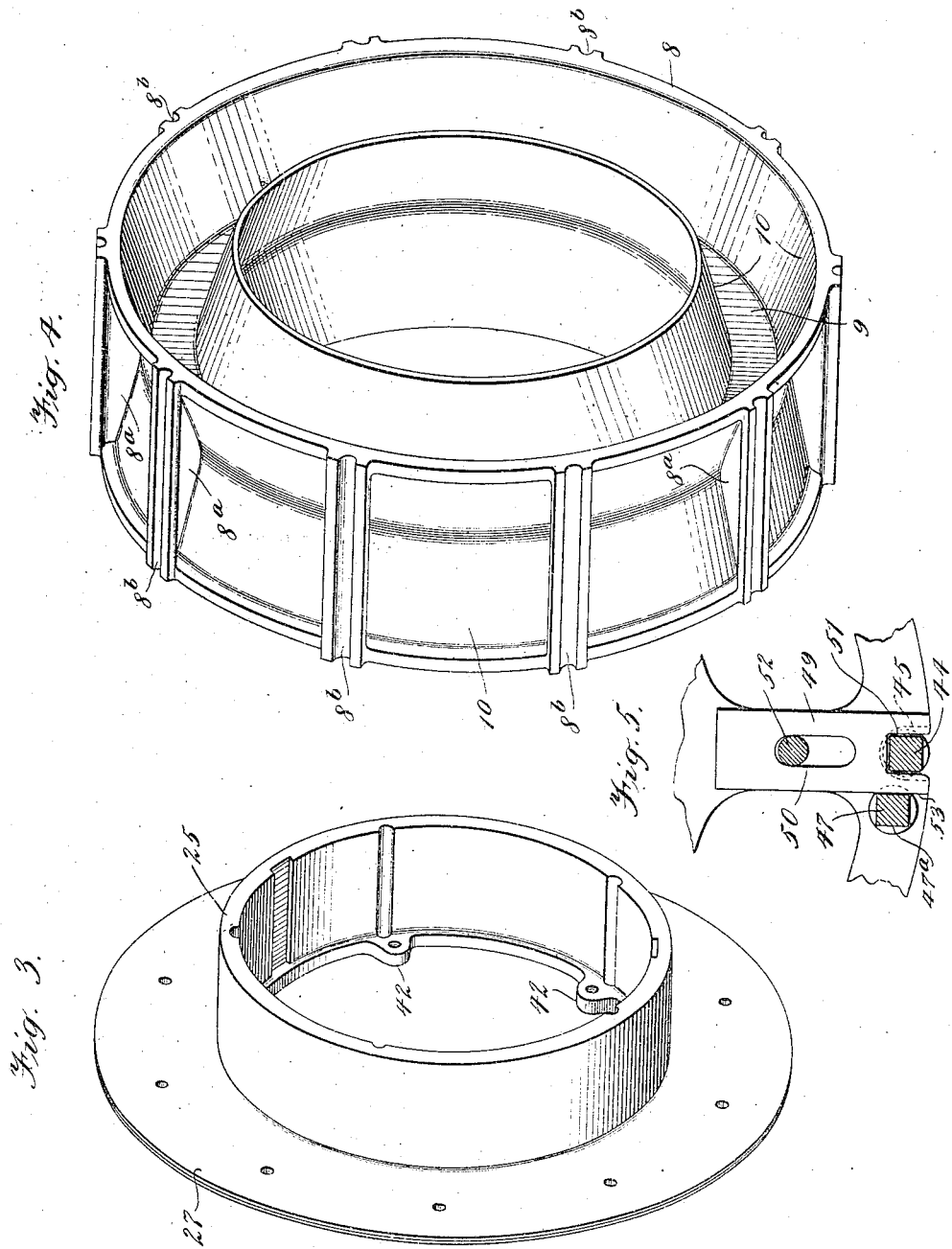

UNITED STATES PATENT OFFICE.

FRED A. KEMP, OF NEW YORK, N. Y., AND EDWIN C. REEDER, OF CHICAGO, ILLINOIS, ASSIGNORS TO LIDGERWOOD MANUFACTURING COMPANY, OF NEW YORK, N. Y., A CORPORATION OF NEW YORK.

MECHANICAL CLUTCH.

1,125,555.  Specification of Letters Patent.  Patented Jan. 19, 1915.

Application filed February 17, 1914. Serial No. 819,162.

*To all whom it may concern:*

Be it known that we, FRED A. KEMP, a subject of the Czar of Russia, residing at New York city, in the county of New York and State of New York, and EDWIN C. REEDER, a citizen of the United States, residing at Chicago, in the county of Cook and State of Illinois, have invented certain new and useful Improvements in Mechanical Clutches, of which the following is a specification.

Our invention relates to new and useful improvements in mechanical clutches, and more particularly to clutches of the type which consist of a double-faced member and opposed clutch elements adapted to engage said member to clutch said elements and member together.

The invention consists in the improvements to be more fully described hereinafter and the novelty of which will be particularly pointed out and distinctly claimed.

Figure 1:
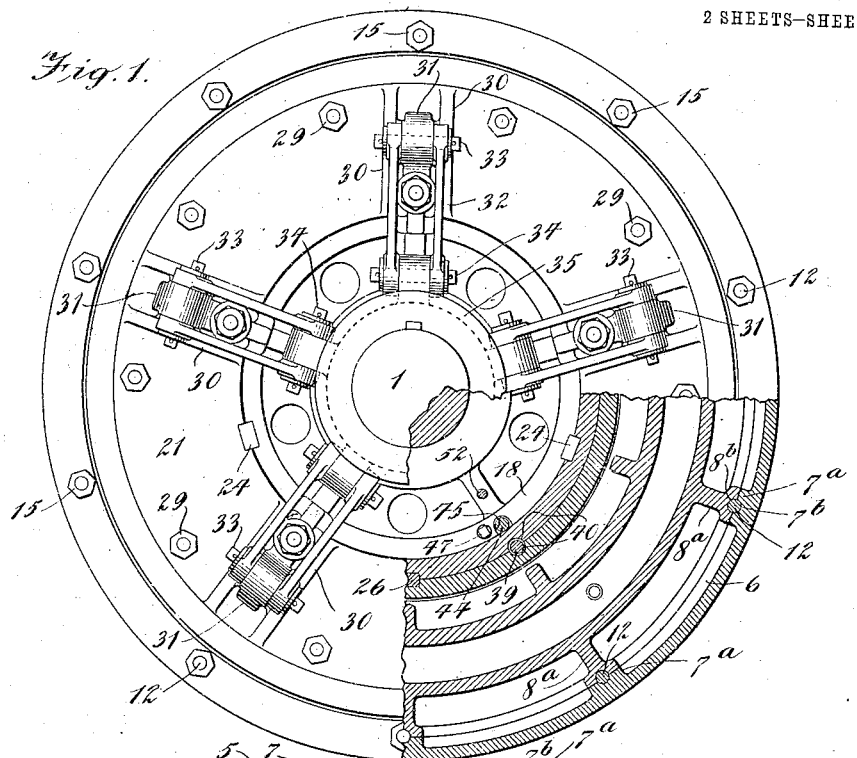
Figure 2:
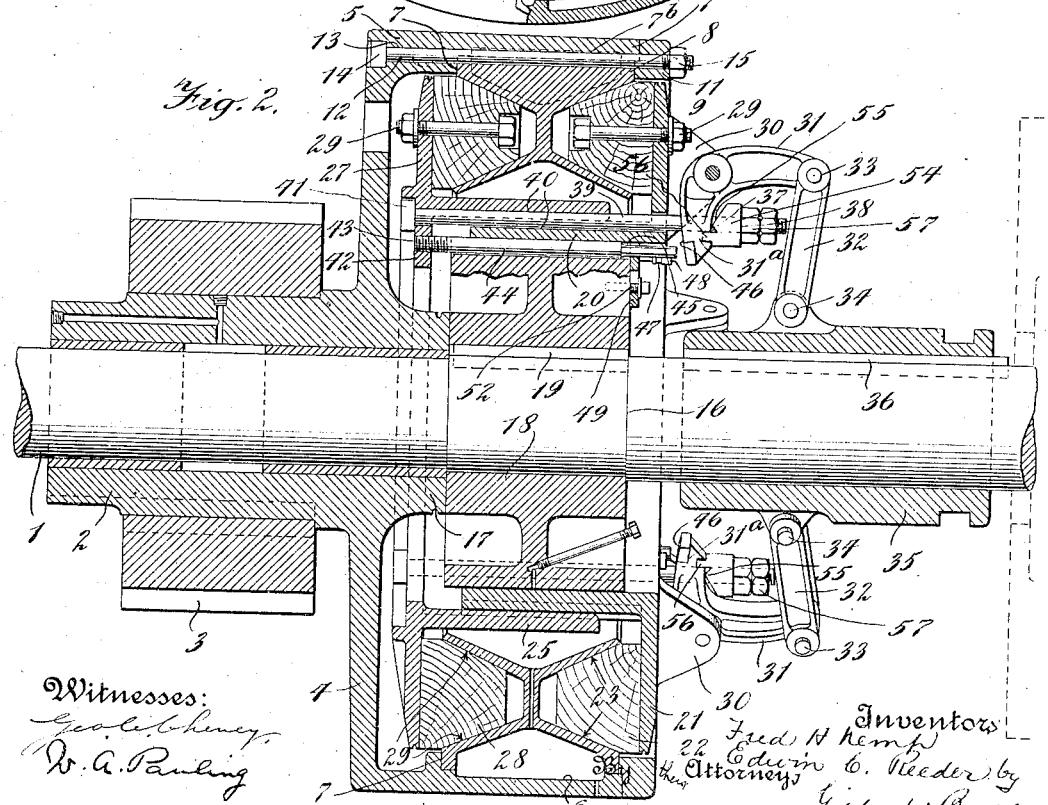

We have fully and clearly illustrated our invention in the accompanying drawings to be taken as a part of this specification, and wherein:

Figure 1 is a view in front elevation of one embodiment of our invention, parts being broken away and others being shown in section. Fig. 2 is a transverse central section taken through the embodiment shown in Fig. 1. Fig. 3 is a perspective view of one of the clutch elements. Fig. 4 is a perspective view of the double-faced member. Fig. 5 is a detail view partly in section of a locking device employed.

Referring to the drawings by characters of reference, 1 designates a shaft upon which the driving and driven elements of the clutch are mounted. Arranged to rotate on the shaft 1 is a sleeve 2 which may carry a gear 3 adapted to form part of a train of gearing to transmit motion to any mechanism which it is desired to drive. At one end the sleeve 2 carries a clutch member, preferably in the form of a disk 4, which is circular in general contour and is arranged in a plane substantially at right-angles to the axis of rotation of the shaft 1. The disk 4 is provided with an annular, laterally-projecting, circumferential flange or rim 5 which, in the present embodiment, carries a double-faced friction member, and incloses the oppositely operating clutch devices which are adapted to engage said double-faced element, all of which will be presently described. At its inner face the flange or rim 5 is cored out to provide a counterbore 6 which terminates adjacent the inner face of the disk 4, thereby forming a shoulder 7, and formed on the inner face of the rim, extending lengthwise of the shaft and parallel to each other are ribs 7$^a$ having longitudinal grooves 7$^b$ for a purpose to be presently set forth. Arranged within the flange or rim 5 is a double-faced clutch member 8 consisting preferably of an annular radial member 9 lying in a plane at right-angles to the axis of rotation of the shaft 1, from which member 9 extend in opposite directions, on each side thereof, oppositely-inclined clutch flanges 10 which flare outwardly from the said annular member 9, thus forming on both sides of the member 9 annular clutch faces which are substantially cone-shaped in cross section, as clearly shown in Figs. 2 and 4. The inner edge of the double-faced clutch member engages the shoulder 7 in the flange 5, and is provided with external webs or ribs 8$^a$, which engage with the ribs 7$^a$, said ribs 8$^a$ having longitudinal grooves 8$^b$ alining with the grooves in the ribs 7$^a$. The member 8 is clamped against said shoulder 7, and thereby locked in position within the flange 5, by means of a clamping ring 11, which engages the outer end of said double-faced clutch member, said ring being held in clamping engagement with said clutch member 8 by means of tie or clamping bolts 12 passing through apertures 13 in the head 4, and through the passages formed by the alining grooves 7$^b$, 8$^b$, each of said bolts having at one end a head 14 engaging the said disk 4, and at its opposite end a clamping nut 15 which engages said ring 11 to cause the same to clamp the double-faced clutch member against said shoulder 7.

Mounted on the shaft 1 between a shoulder 16 thereon and an inwardly-projecting hub portion 17 of the sleeve 2, is a coupling-hub 18, which is keyed to the shaft 1, as at 19, so as to turn therewith. This coupling hub is preferably cylindrical in shape, and mounted thereon and slidable lengthwise thereof is one of the clutch elements adapted to cooperate with one of the clutch-faces formed by the flanges 10 on the member 9, heretofore described. This clutch element preferably includes a sleeve 20 arranged concentric with the hub 18 and the shaft 1, and slidable thereon lengthwise of said shaft, and carrying at its outer end, or that end opposite to the disk 4, an outwardly-projecting circumferential flange 21, preferably lying in a plane at right angles to the axis of rotation, the outer edge of which flange 21 preferably closely approaches the inner surface of the clamping ring 11, heretofore described, as clearly shown in Fig. 2. Mounted upon the inner face of the flange 21 is an annular series of friction blocks 22, or a continuous annular friction element, as may be desired, having its outer edge faces inclined, as at 23, to engage the faces 10, heretofore described, to clutch the element 21 to the member 9 and disk 4. The sleeve 20, just described, is keyed to the hub 18, as at 24, so as to rotate therewith. Surrounding the sleeve 20, and slidable lengthwise thereof, is a second clutch element adapted to coöperate with the inner face of the element 9, said last-mentioned clutch element preferably including a sleeve 25 keyed to the sleeve 20, as at 26, and carrying at its inner end an annular circumferential flange 27, carrying on its inner face an annular series of friction blocks, or a continuous friction ring, as may be desired, as shown at 28, having oppositely-disposed inclined faces 29 adapted to coöperate with the inclined faces 10, heretofore described, on the opposite side of the member 8 from the frictions 22, when the parts are clutched together. The friction blocks or rings may be secured to the elements 21 and 27 in an suitable manner, as by fastening bolts 29.

We will now proceed to describe the means for moving the elements 21 and 27 toward and away from each other to clutch the same with, and unclutch them from, the element 9. Mounted on the outer face of the element 21 are pairs of parallel ears 30, there preferably being five pairs of such ears, as will be understood from an examination of Fig. 1 of the drawings. Fulcrumed in each pair of ears, at a point intermediate its ends, is a bell-crank lever 31, one arm of each of said levers extending in a general direction longitudinally of the shaft and away from the element 21, and having connected to its free outer end a connecting link 32, as at 33, the opposite end of said link being pivoted, as at 34, to an operating sleeve 35 splined to the shaft 1, as at 36, to turn with said shaft and move longitudinally of the same as shown in Fig. 2. The inner free ends 31ª of the bell-crank lever are each formed with a cam face 37 adapted to coöperate with a head 38 on a thrust bolt 39 extending through alining recesses 40 respectively in the inner face of the sleeve 25 and the sleeve 20, and connected at one end to the disk 27, heretofore described, as shown at 41. By this arrangement, when the sleeve 35 is moved so as to throw the cam surfaces 37 into engagement with the heads 38, the bolts 39 will be pulled in the direction of movement of said sleeve 35 to move said disk 27 toward the element 9, and thereby throw the friction blocks 29 into engagement with the cone friction faces 10 on that side of the member 8. By this same operation the reaction of forces on the flange 21 will move the latter toward said element 9 to throw the friction blocks 22 into engagement with the cone friction surfaces 10 on the other side of the element 9 from the blocks 29. It will thus be seen that movement of the sleeve 35 in one direction serves to move both sets of friction elements into contact with the opposite faces of the member 9, and that movement of the sleeve 35 in the opposite direction will relieve the pressure of the disks 21 and 27 on the clutch element 9, thereby tending to unclutch the parts and permit the clutch elements to run free from said element 9.

In order to insure simultaneous disengagement of the friction elements from the element 9, and positive movement of the same out of contact with said element, and to maintain them parallel during such movement, we provide means for positively moving said friction elements apart when the sleeve 35 is moved to relieve the frictional contact, which means I will now describe.

At its inner end, or that end nearer the disk 4, the sleeve 29 is provided with an inwardly-extending circumferential flange having ears 42, into which are threaded, as at 43, the ends of thrust rods or bolts 44, which pass through grooves 45 extending lengthwise of the hub 18, and the free end of which rods project beyond the outer end of the sleeve 20 into position to be engaged by the faces 46 on the bell-crank cam levers 31, which faces are on the opposite sides of the parts 31ª from the faces 37, the arrangement being such that, when the sleeve 35 is moved toward the clutch hub to relieve the friction, said faces 46 of the cam levers will respectively engage the ends 45 of the bars or bolts 44 to positively thrust the same lengthwise of the shaft and clutch hub toward the disk 4, and thereby move the element 27 to carry its friction blocks out of contact with the cone clutch faces of the element 9. The bars 44, by virtue of their threaded connections with the ears 42, may be adjusted as to length so as to regulate the distance to which the element 27 is moved away from the element 9 by the levers 31. The outer projecting ends of the rods 44 may be squared, in cross-section, so that they may be conveniently engaged by a wrench or other tool when adjustment is required.

Threaded into openings in the outer face of the hub 18, and arranged respectively, adjacent the ends 45 of the bars 44, are thrust bolts 47, the outer end faces of the heads 48 of which are arranged in a plane nearer to the outer end face of the hub 18 than that plane occupied by the end faces of said bars 44 so that, when the faces 46 of the cam levers are moved into engagement with the outer ends of said bars 44, said bars will first be moved as above set forth, and said levers will then be moved into engagement with the faces 48 on said thrust bolts, and the force of said levers therefore will be exerted, not only to push the element 27 away from the element 9, but also to pull the element 21 away from said element 9 through reaction of the forces exerted on the heads of the thrust bolts and said element 21.

The thrust bolts 47 are adjustable in their threaded sockets so as to determine the distance the oppositely-disposed clutch elements 21 and 27 will be moved when being disengaged from the double-faced clutch member 9, and are preferably provided with squared shanks 47ª for a purpose to be set forth, and the heads 48 are also polysided to be engaged by a wrench or other tool. In order to maintain the bolts 44 and the thrust bolts 47 in adjusted position, so that the extent movement of the clutch elements 21 and 27 will be maintained constant, we provide locking devices, each of which coöperates with one of the bolts 44 and the adjacent thrust bolt to prevent turning of said bolts. This locking device may take a number of forms within the scope of our invention, but we prefer to make it in the form of a locking plate 49 having a longitudinal slot 50, and an end recess 51 shaped to conform to the polysided head 45 of the bolt 44, to coöperate with said head to prevent turning thereof, the locking plate being held in place by a bolt 52 passed through the slot 50 and threaded into the coupling hub 18. The plate 49 is of such dimensions and is so arranged that a side face 53 thereof will contact the squared shank of the thrust bolt 47ª and thereby lock the same against turning, as appears clearly from Fig. 5. It will be understood that there is one of these locking plates for each of the rods 44 and the adjacent bolt 47. When adjustment is necessary, the rods 44 and bolts 47 may be released for this purpose, by loosening the fastening bolts 52 and moving the plates 49 toward the axis of rotation to release the bolts 44 and the thrust bolts 47.

The head 38 on the outer end of each of the pull bolts or devices 39 is made adjustable, the adjustment of the said heads being provided in order to regulate the throw of the clutch elements 21 and 27 toward the double-faced clutch element 9 when the friction is being applied. These heads preferably each consist of a sleeve 54 loosely mounted upon the outer end of the bolt 39 and provided on opposite sides of the bolt with fulcrum points 55 adapted to be engaged by the face 37 of the adjacent operating lever 31. At its lower portion, or that part toward the shaft, each sleeve 54 is provided with spaced projections 56, adapted to receive between them the arm 31ª of the cam lever, the arrangement being such that the sleeve is always held in position to have the fulcrum points 55 properly engaged by the face 37 of the cam lever. The movement of the sleeves 56 is limited in a direction toward the hub 18 by the portion 31ª of the cam lever, and in the opposite direction by means of collars or nuts 57, which may be fixed on the end of the bolt by any suitable means, as by being threaded thereon, as shown.

We believe the operation of the preferred embodiment of the invention above described will be clear, but we briefly describe such operation as follows: The parts are assembled substantially in the general arrangement and combination shown in the drawings, and the heads 38 on the pull-bolts 39 are adjusted relative to the operating levers so that when the latter are moved to set the clutch, the clutch elements 21 and 27 will be moved into engagement with the friction surfaces 10 of the clutch member 9 with the proper degree of friction to be necessary to couple the parts. The thrust rods 44 are also adjusted so that when engaged by the faces 46 on the operating levers the clutch element 27 will be moved away from the friction surface 10, with which it coöperates, a distance preferably equal to that it is moved when the clutch is being set. The thrust bolts 47 are also adjusted so that when the friction element 21 is moved out of engagement with its friction surface 10 its extent of movement will be equal to that it takes when the parts are clutched together. With the parts adjusted in the manner described, and in the position shown in Fig. 2, in which the parts are shown as clutched together, if it is desired to uncouple the parts the sleeve 35 is moved toward the coupling hub 18, which operation will, serve to pull the outer arms of the bell-crank levers 31 in toward the axis of rotation, thereby relieving the thrust of said levers on the heads 38 of the bolts 39, whereby friction connection between the clutch elements 21 and 27 and the friction surfaces 10 is relieved. Continued movement of the sleeve 35 toward the hub 18 will then bring the surfaces 46 of the bell-crank levers into engagement with the outer ends of the thrust rods 44, which will serve to positively push the friction element 27 out of engagement with the clutch member 9, such movement continuing until the said faces 46 on the operating levers engage the heads of the bolts 47, when the reaction of forces between said bolts and the element 21 exerted by said levers will serve to positively pull said element 21 out of engagement with the friction surface 10.

By the operation described the clutch parts are disconnected and are free to rotate independently of each other. When it is desired to couple the clutch parts the sleeve 35 is moved away from the coupling hub 18, which operation serves to bring the surfaces 37 on said levers into engagement with the fulcrum points 55, and the force of the levers is exerted on the rods 39, and through reaction on the element 21, to move the clutch element 27, and the clutch element 21, into engagement with the friction 10. The arrangement described not only provides a convenient and efficient means for coupling and uncoupling the parts, but insures simultaneous engagement of the friction elements with the member 9, the positive movement of the clutch elements out of engagement with said member 9, and also serves to maintain the clutch elements in parallelism throughout the setting and unsetting movements.

What we claim and desire to secure by Letters Patent of the United States is:—

1. In a clutch, in combination, a double-faced member, oppositely disposed clutch elements adapted to engage the faces of said member, pull devices connected to one of said elements, and cam levers fulcrumed on the other of said elements, and adapted to exert pull on said devices to move said elements into engagement with said double-faced member, and means independent of said pull devices adapted to be engaged by said levers to positively separate said elements.

2. In a clutch, in combination, a double-faced member, a clutch hub, oppositely disposed clutch elements adapted to engage the faces of said member, said elements being carried by concentric sleeves surrounding said clutch hub, pull devices connected to one of said elements, and cam levers fulcrumed on the other of said elements and adapted to exert pull on said devices to move said elements into engagement with said double-faced member.

3. In a clutch, in combination, a double-faced member, a clutch hub, oppositely disposed clutch elements adapted to engage the faces of said member, said elements including concentric sleeves surrounding said clutch hub, pull devices connected to one of said elements and passing between said sleeves, and cam levers fulcrumed on the other of said elements and adapted to exert pull on said devices to move said elements into engagement with said double-faced member.

4. In a clutch, in combination, a double-faced member, oppositely disposed clutch elements adapted to engage the faces of said member, reaction levers fulcrumed on one of said elements, connections between said levers and the other of said elements to move the same into engagement with said double-faced member, and thrust means independent of said connections and acted on by said levers to separate the clutch elements from said double-faced member.

5. In a clutch, in combination, a double-faced member, oppositely disposed clutch elements adapted to engage the faces of said member, pull rods connected to one of said elements, cam levers fulcrumed on the other of said elements and operable on said rods and by reaction on the element upon which they are fulcrumed, to move said elements into engagement with said double-faced member, thrust members carried by the clutch element to which element the pull rods are connected, said thrust members being in the path of movement of said levers when moved to release the clutch elements from said double-faced member whereby the clutch elements are positively separated.

6. In a clutch, in combination, a double-faced member, a coupling member, clutch elements surrounding said coupling member and adapted to engage the faces of said double-faced member, cam levers fulcrumed on one of said elements and having engagement with the other element to move said elements into engagement with said double-faced member and to release said engagement, and thrust devices carried by one of said elements and operable by said levers when releasing said engagement to positively separate the clutch elements from the double-faced member.

7. In a clutch, in combination, an annular double-faced clutch member, a shaft, a coupling hub fixed to the shaft, a clutch element adapted to coöperate with one of the faces of said member and including a sleeve mounted to slide on said hub, a second clutch element adapted to coöperate with the other face of said member and including a sleeve slidably mounted on said first-named sleeve, pull-rods connected to said last-named clutch element and passing between said sleeves and provided with heads on their outer ends, and cam levers mounted on said first-named clutch element adapted to engage said heads to move said clutch elements into engagement with said member.

8. In a clutch, in combination, an annular double-faced member, a shaft passing through said member a coupling hub mounted on the shaft and within said member, a clutch element adapted to coöperate with one of the faces of said member and including a sleeve slidably mounted on said hub, a second clutch element adapted to coöperate with the other face of said member and including a sleeve slidably mounted on said first-named sleeve, operating means for moving the clutch elements together to clutch said member, and thrust rods connected to said last-named clutch element and operated on by said operating means to cause the clutch elements to release said member.

9. In a clutch, in combination, a shaft, an annular double-faced clutch member surrounding the shaft, a coupling hub fixed to the shaft and arranged within said member, annular clutch elements movable toward and away from each other to be engaged with and disengaged from said member, means for operating said clutch elements, connections between said means and elements for moving the latter toward said member, and means independent of said connections and operable by said means for positively moving said elements out of engagement with said member.

10. In a clutch, in combination, a shaft, an annular double-faced clutch member, a coupling hub fixed to the shaft, a clutch element adapted to coöperate with one of the faces of said member and including a sleeve slidably mounted on said hub, a second clutch element adapted to coöperate with the other face of said member and including a sleeve slidably mounted on said first-named sleeve, pull rods connected to said last-named clutch element and passing between said sleeves, clutch levers mounted on said first-named clutch element and having connection with said pull rods for moving the clutch elements into engagement with said member, thrust rods connected to the same clutch element as said pull rods and located in the path of movement of said levers whereby movement of the levers in releasing engagement of the clutch elements of the said member causes said thrust rods to be engaged by said levers to positively disengage said clutch elements from said member.

11. In a clutch, in combination, a shaft, an annular double-faced clutch member, a coupling hub fixed to the shaft, a clutch element adapted to coöperate with one of the faces of said member and including a sleeve slidably mounted on said hub, a second clutch element adapted to coöperate with the other face of said member and including a sleeve slidably mounted on said first-named sleeve, pull rods connected to said last-named clutch element and passing between said sleeves, clutch levers mounted on said first-named clutch element and having connection with said pull rods for moving the clutch elements into engagement with said member, thrust rods connected to the same clutch element as said pull rods and passing between said coupling hub and the first-named clutch and having their free ends located in the path of movement of said levers whereby movement of the latter in releasing engagement of the clutch elements with the said member causes said thrust rods to be engaged by said levers to positively disengage said clutch elements from said member.

12. In a clutch, in combination, a double-faced member, clutch elements adapted to engage the faces of said member, pull rods connected to one of said elements, operating levers fulcrumed on the other of said elements and having an adjustable connection with said pull rods and adapted, when moved in one direction, to move said elements into engagement with said member and, when moved in the opposite direction, to release said member, thrust rods connected to the same element as said pull rods and arranged in the path of movement of said levers to be engaged thereby when said levers are moved to release said member, to positively move said clutch elements out of engagement with said member.

13. In a clutch, in combination, a double-faced member, clutch elements adapted to engage the faces of said member, pull rods connected to one of said elements, operating levers fulcrumed on the other of said elements and having an adjustable connection with said pull rods and adapted, when moved in one direction, to move said elements into engagement with said member and, when moved in the opposite direction, to release said member, thrust rods connected to the same element as said pull rods and arranged in the path of movement of said levers to be engaged thereby when said levers are moved to release said member, to positively move said clutch elements out of engagement with said member, said thrust rods having an adjustable connection with said clutch element.

14. In a clutch, in combination, a double-faced member, a coupling hub located within said member, clutch elements adapted to engage said double-faced member, operating levers mounted on one of said elements and having connection with the other element whereby said levers, when moved in one direction, move said elements into engagement with said member, and, when moved in the opposite direction, release said member, thrust rods connected to the clutch element opposite to that carrying said levers, and thrust devices mounted on said hub, said thrust rods and thrust devices being mounted in the path of movement of said levers when releasing said member whereby said levers engage said rods and devices to positively move the clutch elements out of engagement with said member.

15. In a clutch, in combination, a double-faced member, a coupling hub located within said member, clutch elements adapted to engage said double-faced member, operating levers mounted on one of said elements and having connection with the other element whereby said levers, when moved in one direction, move said elements into engagement with said member, and, when moved in the opposite direction, release said member, thrust rods connected to the clutch element opposite to that carrying said levers, and thrust devices mounted on said hub, said thrust rods and thrust devices being mounted in the path of movement of said levers when releasing said member whereby said levers engage said rods and devices to positively move the clutch elements out of engagement with said member, said thrust devices comprising bolts threaded into said hub.

16. In a clutch, in combination, a double-faced member, a coupling hub located within said member, clutch elements adapted to engage said double-faced member, operating levers mounted on one of said elements and having connection with the other element whereby said levers, when moved in one direction, move said elements into engagement with said member, and, when moved in the opposite direction, release said member, thrust rods adjustably threaded in said clutch element connected to the clutch element opposite to that carrying said levers, and thrust devices mounted on said hub, said thrust rods and thrust devices being mounted in the path of movement of said levers when releasing said member whereby said levers engage said rods and devices to positively move the clutch elements out of engagement with said member, and means to prevent rotation of said thrust rods and bolts.

17. In a clutch, in combination, a double-faced member, oppositely disposed clutch elements adapted to engage the faces of said member, pull devices connected to one of said elements, cam means acting on said pull devices and the other of said elements to move said elements into engagement with the said member, and means independent of said pull devices adapted to be operated by said cam means to positively disengage said elements from said member.

18. In a clutch, in combination, a shaft, an annular double-faced clutch member surrounding the shaft, a coupling hub fixed to the shaft and arranged within said member, annular clutch elements movable toward and away from each other to be engaged with and disengaged from said member, said elements including concentric sleeves slidably disposed about said hub, means for moving said clutch elements into engagement with said member, and disengaging said elements from said member, and thrust devices adapted to be engaged by said means to positively remove said elements out of engagement with the clutch member.

19. In a clutch, in combination, a double-faced member, a hub, clutch elements adapted to engage said double-faced member, means carried by one of said elements and movable in one direction to engage said elements with said member and in the other direction to relieve said elements from engagement with said member, thrust rods carried by the clutch element opposite to that carrying said means, thrust devices mounted on said hub, said thrust rods and thrust devices being mounted in the path of movement of said means when disengaging said elements from the said member whereby the said means engages said rods and devices to positively move the clutch elements out of engagement with said member.

20. In a clutch, in combination, a double-faced member, oppositely disposed clutch elements adapted to engage the faces of said member, pull devices connected to one of said elements, operating means acting on said pull devices and the other of said elements to move said elements into engagement with said member, and means independent of said pull devices adapted to be operated by said operating means to positively disengage said elements from said member.

21. In a clutch, in combination, a double-faced member, oppositely disposed clutch elements adapted to engage the faces of said members, pull devices connected to one of said elements, operating means acting on said pull devices and the other of said elements to move said elements into engagement with said elements, and thrust rods on the elements to which the said pull devices are connected and arranged to be acted upon by said operating means to positively disengage said elements from said member.

In testimony whereof we have hereunto signed our names in the presence of the subscribing witnesses.

FRED A. KEMP.
EDWIN C. REEDER.

Witnesses to the signature of Fred A. Kemp:
TRITIOF CARLSON,
CYRUS EVERS.

Witnesses to the signature of Edwin C. Reeder:
C. H. WARDEN,
O. D. WEAVER.